Nov. 29, 1955     A. LEDUC     2,724,915
SNOW REMOVER
Filed Feb. 4, 1952
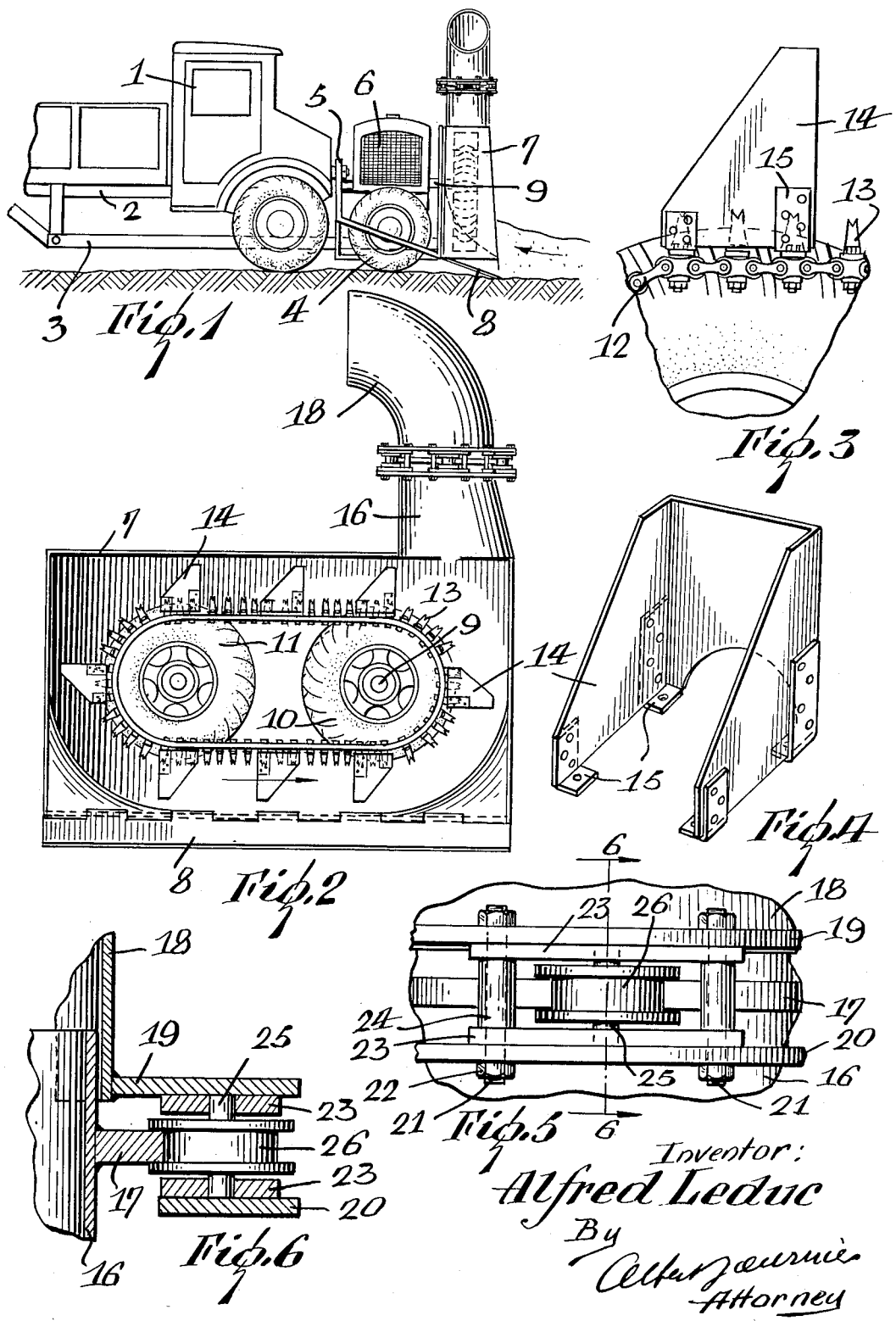

United States Patent Office 2,724,915
Patented Nov. 29, 1955

2,724,915

SNOW REMOVER

Alfred Leduc, Ile Perrot, Quebec, Canada

Application February 4, 1952, Serial No. 269,722

2 Claims. (Cl. 37—45)

The present invention pertains to a novel snow remover.

The principal object of the invention is to combine a bucket chain with an exhauster, so that the two devices operate as one apparatus.

It is an accepted fact that the removal of snow from highways, embankments, air fields and railways has become a gigantic task. The organization for this work requires a number of machines which complement each other and some of which are adapted to special circumstances, such as the hardness, settling, or depth of the snow, for example. In general, certain types of snow removal machines are not practical for all the special conditions.

An object of the invention is to provide a machine that replaces the various special machines. Another object is to provide flexibly mounted buckets which cannot become damaged by blocks of ice or other hard objects in or near the snow.

A further object is to provide an adjustable outlet pipe mounted on rollers. Finally, it is an object to provide an inexpensive apparatus that is easily mounted on the front end of a truck.

In the accomplishment of these objects, the invention comprises an assembly mounted on a frame at the forward end of the truck. The assembly includes a pair of wheels driven by an auxiliary motor. The wheels are rubber-tired for the flexibility mentioned above and carry bucket chains for picking up the snow and discharging it through the outlet of the collector as set forth.

The invention is fully disclosed by way of example in the following description and in the accompanying drawings in which:

Figure 1 is an elevation of the device adapted to the front of a truck;

Figure 2 is a front view;

Figure 3 is a side view of a bucket and a portion of the endless chain;

Figure 4 is a perspective view of a bucket;

Figure 5 is a detail elevation; and

Figure 6 is a section on the line 6—6 of Figure 5.

References to these views will now be made by use of like characters which are employed to designate corresponding parts throughout.

Figure 1 shows a truck 1 having a chassis 2 reinforced by longitudinal members 3 disposed below the body and extending forward, where they are supported by auxiliary wheels 4. The latter carry moreover a frame 5 on which is mounted an auxiliary motor 6. The frame 5 supports a collector 7 consisting of a box or housing lying transversely of the truck and open at one end. At the bottom of the collector is an inclined scoop 8. A shaft 9 extends from the motor 6 into the collector 7, and on the forward end of this shaft is secured a rubber-tired wheel 10. A similar wheel 11 is mounted idly in the collector adjacent to and in line with the wheel 10.

The wheels 10 and 11 are joined by an endless drive consisting of a pair of endless chains 12 parallel to each other and mounted side by side on the wheels. These chains, although spaced apart, are interconnected by transverse members 13 equidistantly spaced and bent in V-shape to ride on the tires and thus drive one wheel from the other.

The chains carry equidistantly spaced buckets 14 which also ride on the tires. These buckets, one of which is shown in Figure 4, are attached by means of brackets 15 to the several links of the chains 12 in order not to interfere with the flexibility of the chains.

Above the wheel 10, the intake end of the collector 7 is surmounted by a vertical pipe 16 surrounded at a short distance from its lower end by a ring 17 welded thereto. The pipe 16 is extended by a curved pipe or elbow 18 telescoped loosely on the upper end of the pipe 16, as shown in Figure 6. To the lower end of the pipe 18 is welded a flange 19 from which is suspended a parallel ring 20 by means of bolts 21 and nuts 22. The flange and the ring are reinforced at intervals by plates 23 held in place by sleeves 24 on the bolts 21. Finally, opposed plates 23 are oppositely apertured to receive trunnions 25 carrying each a flanged roller 26.

As the collector 7 advances with the truck in a blanket of snow and the wheels 10 and 11 are driven by the motor 6 and the endless connecting drive, the buckets 14 pick up the snow and throw at the discharge pipe 16 and its extension 18. Since the endless drive is mounted on pneumatic tires, any solid matter coming into contact with the buckets cannot damage them, because of their support on resilient bodies. When a solid body has been released from the apparatus, the buckets return to their normal position. The buckets are therefore indestructible since they offer no resistance to solid bodies. The elbow 18 is easily adjusted in direction by the riding of the rollers 26 on the ring 17 of the pipe 16.

Although a specific embodiment of the invention has been illustrated and described, it will be understood that various alterations in the details of construction may be made without departing from the scope of the invention as indicated by the appended claims.

What I claim is:

1. A snow remover comprising a body structure, a pair of spaced and parallel shafts therein, a resiliently-tired wheel on each shaft, a pair of link chains joining said wheels at the sides thereof, transverse members joining said chains, and buckets connected to and across said chains at two points on each chain, whereby to straddle the chains and wheels, each bucket having an opening facing lengthwise of the chain in the direction of travel.

2. A snow remover comprising a body structure, a pair of spaced and parallel shafts therein, a resiliently-tired wheel on each shaft, a pair of link chains joining said wheels at the sides thereof, transverse members joining said chains, and buckets connected to and across said chains at two points on each chain, whereby to straddle the chains and wheels, each bucket having an opening facing lengthwise of the chain in the direction of travel, each bucket having two side walls and a transverse wall, with a recess in the lower edge of said transverse wall above the lower edges of the side walls, said opening receiving the tread surfaces of said wheels, and the last named edges overlapping said wheels.

References Cited in the file of this patent

UNITED STATES PATENTS

| | | |
|---|---|---|
| 2,007,910 | Stephens | July 9, 1935 |
| 2,243,538 | Salifisberg | May 27, 1941 |
| 2,326,535 | Hapman | Aug. 10, 1943 |
| 2,357,651 | Hapman | Sept. 5, 1944 |
| 2,408,857 | James | Oct. 8, 1946 |